T. R. CORMICK.
Wheel-Cultivator.
No. 30,723.
Patented Nov 27, 1860.
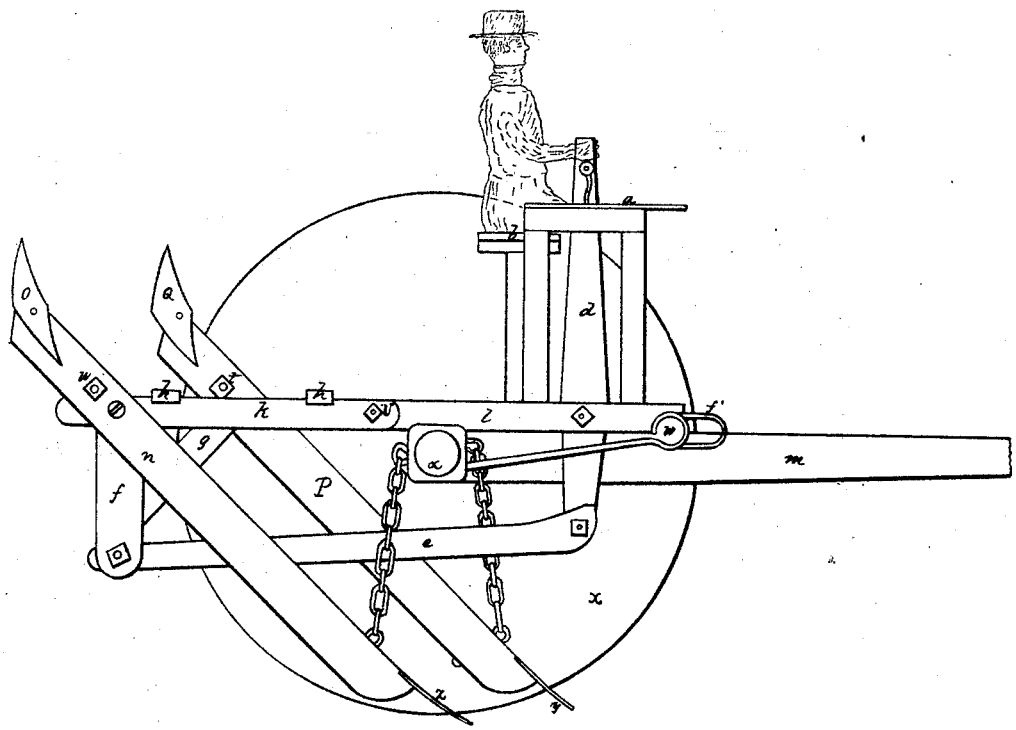
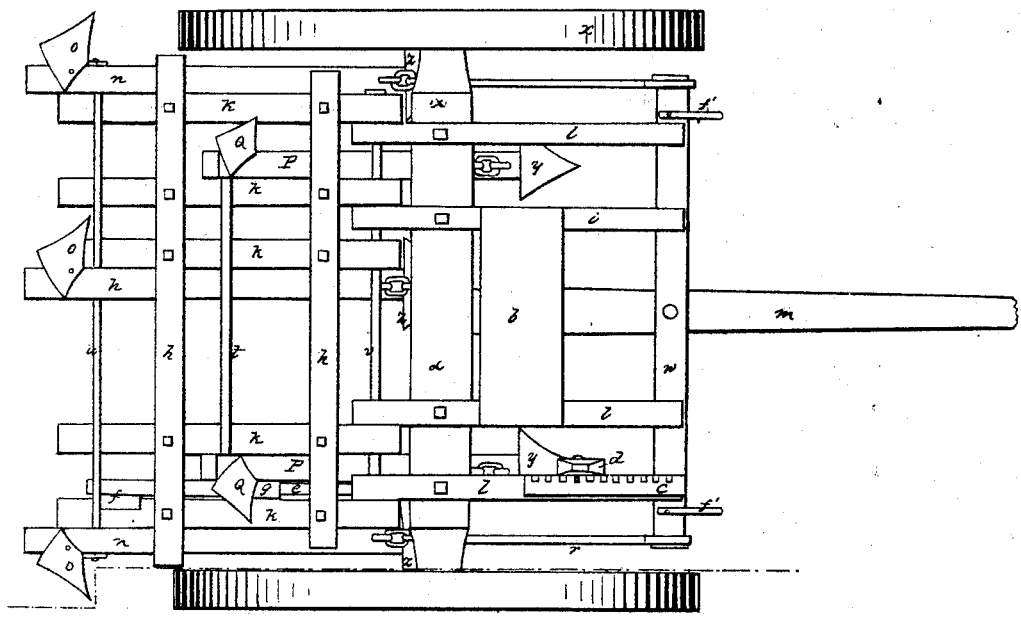

UNITED STATES PATENT OFFICE.

TULLY R. CORNICK, OF CAP-AU-GRIS, MISSOURI.

IMPROVEMENT IN PLOWS.

Specification forming part of Letters Patent No. 30,723, dated November 27, 1860.

*To all whom it may concern:*

Be it known that I, TULLY R. CORNICK, of Cap-au-Gris and county of Lincoln, in the State of Missouri, have invented a new and useful machine for the cheaper plowing of ground, for the cheaper seeding of small grain, and for the cheaper and more thorough cultivation of growing crops than any method heretofore known; and I do hereby declare that the following is a full, clear, and exact description of the construction and operation of the same, reference being had to the annexed drawings, making a part of this specification, in which—

Figure 1 is a perspective view, and Fig. 2 is a longitudinal elevation.

To enable persons skilled in the art to make and use my invention, I will proceed to describe its construction and operation.

A cart-tongue, *m*, is permanently fixed to an axle, *d*, to which are attached a pair of wheels, *x*, such as are used on a farm-cart or as the fore or hind wheels of a farm-wagon; but the higher the wheels the more practicable will it be found to use the implement in the cultivation of a growing crop in its last stages of growth. A cross-piece, *w*, is bolted onto the tongue in front of and parallel with the axle, and four pieces, *l*, connecting the axle and the cross-piece *w*, are fixed, one end to the axle, the other to said cross-piece, by bolts and nuts. This arrangement and combination constitute what I call the "front frame."

The hind frame consists of five pieces, *k*, of timber, about three inches square and of any length desired, and confined by means of two other pieces of timber, *h*, by means of bolts and nuts. No shoulders are used in fastening the pieces *h* to the pieces *k*, and thus by changing the relative distances of the pieces *k* can be easily changed to suit the size of the plows which the kind of work to be done requires. The three helves *n* are fastened, two of them to the outside pieces *k*, the other to the center piece *k*, by means of bolts and nuts. The two helves P are fastened to the remaining pieces *k* by the same means. The distances of the pieces *k* from one another are determined by the size of the plows used, and the distance of the helves P in advance of the helves *n* is determined by the same consideration. The proper position of the helves P is secured by means of a chain attached to that part of the helve immediately above the plow by a bolt with an eye, and the other end of the chain is secured by means of a bolt with an eye on the under side of the piece *e* nearest the helve and at a point immediately in advance of the axle; and that end of the chain, instead of being permanently fixed, is passed through the eye and brought down and hooked in one of its own links, so as to give a greater facility for varying the depth at which the plow is to be set. The proper position of the helves *n* is secured by a similar contrivance of chains attached to the rear side of the axle.

Plows can be used of any of the known forms—such as shovel-plows, bull-tongues, Cary's diamonds, bar-shares, &c.—of such character and size as required by the kind of work to be done.

The annexed drawings are intended to represent helves to the lower ends of which shovel-plows or bull-tongues are adjusted and to the upper ends of which turning-plows are fixed, so that, if it be wished, the helves can be reversed and the ground subjected to the action of the turning-plow. By means of the bolts which fasten the helves to the hind frame the plows can be set at any desired depth, and such depth is so fixed by the whole arrangement of the implement that with the proper team the ground must be stirred at that depth, and without any variation in the line of direction from the direction indicated by the tongue.

The two frames (the hind frame and front frame) are connected by means of the rod *r*, and their relative position is fixed by means of the lever *e e*, and by means of the lever the hind frame and the plows can be lifted above small obstructions. The seat *e* is occupied by the teamster. If it be desired to cultivate a growing crop—such as corn, cotton, sugar-cane, &c.—as the team, then consisting of two horses or mules, must be driven one on each side of the row of corn, cotton, &c., the center helve, with the plow attached to it, must be removed, and the distance between the two inside helves of the remaining four must be fixed at such distance from the center as will suit the breadth of the strip of land occupied by the growing crop to be cultivated. If the condition of the ground and character of the season be such as to make it proper to cultivate the growing crop with turning-plows instead of shovels or bull-tongues, then two right-hand and two left-hand turning-plows must be used with those of the same kind on the right-hand or left-hand side of the plant cultivated, according as it is most proper to throw the dirt to the corn or cotton, &c., or from it. The distance on the axle from shoulder to shoulder must be such when the implement is to be used as a cultivator of a growing crop as will suit the distance between the rows of corn, cotton, &c.

The implement with all of the helves attached can be used for covering in small grain, and must of necessity seed more than double the ground which can be seeded by a harrow worked with the same team, as the depth to which land in proper tilth is to be stirred is absolutely fixed, and the necessity of going more than once over the same ground in order to cover all the seed is thus dispensed with. If the object be to break land for the purpose of preparing it for some crop afterward to be seeded, the number of plows and length of axle and corresponding breadth of the frames must be such as will suit the strength of the team to be used, and turning-plows, either all of them right hand or all of them left hand, must be used.

I disclaim the invention of any one single separate part of this machine.

What I claim as my invention, and desire to secure by Letters Patent, is—

The combination and arrangement of the cross-piece $w$, tongue $m$, axle $d$, wheels $x$, pieces $c$, cross-piece $w$, pieces $k$, cross-pieces $h$, helves $n$ and P, chains $s$, plows O Q Z Y, rod $v$, levers $c\ e\ f$, and seat $e$, substantially as described, and for the purposes set forth.

T. R. CORNICK.

Witnesses:
WM. H. CRENSHAW,
J. RUMP.